United States Patent

[11] 3,560,715

| [72] | Inventors | Hiroo Akamatsu<br>Osaka;<br>Masanori Nagata, Kyoto, Japan |
|---|---|---|
| [21] | Appl. No. | 641,916 |
| [22] | Filed | May 29, 1967 |
| [45] | Patented | Feb. 2, 1971 |
| [73] | Assignee | Omron Tateisi Electronics Co.<br>Kyoto, Japan<br>a company of Japan |

[54] APPARATUS FOR CHANGING THE INFORMATION RECORDED ON CARDS
9 Claims, 8 Drawing Figs.

| [52] | U.S. Cl. | 235/61.8,<br>235/61.11, 340/149 |
|---|---|---|
| [51] | Int. Cl. | G06k 5/02 |
| [50] | Field of Search | 235/61.8,<br>61.7, 61.7b, 61.9, 61.11; 340/149A |

[56] References Cited
UNITED STATES PATENTS

| 2,357,455 | 9/1944 | Bryce | 235/61.9 |
| 3,287,543 | 11/1966 | Halpern | 235/61.8A |
| 3,457,391 | 7/1969 | Yamamoto | 235/61.11 |

*Primary Examiner*—Thomas A. Robinson
*Attorney*—Christensen, Sanborn & Matthews ABSTRACT: An apparatus for changing the information recorded on cards and especially the monetary value given to cards used in place of coins and/or bills in automatic vending machines and the like. The monetary value of a card as represented by code markings thereon is first read and memorized. Upon selection of an article the monetary value assigned thereto is subtracted from the memorized value read from the card. The result of the subtraction is recorded on the card for future use in place of the original monetary value recorded on the card. Dispensing of articles having a value greater than the memorized value is prevented. System and detailed circuit diagrams are provided.

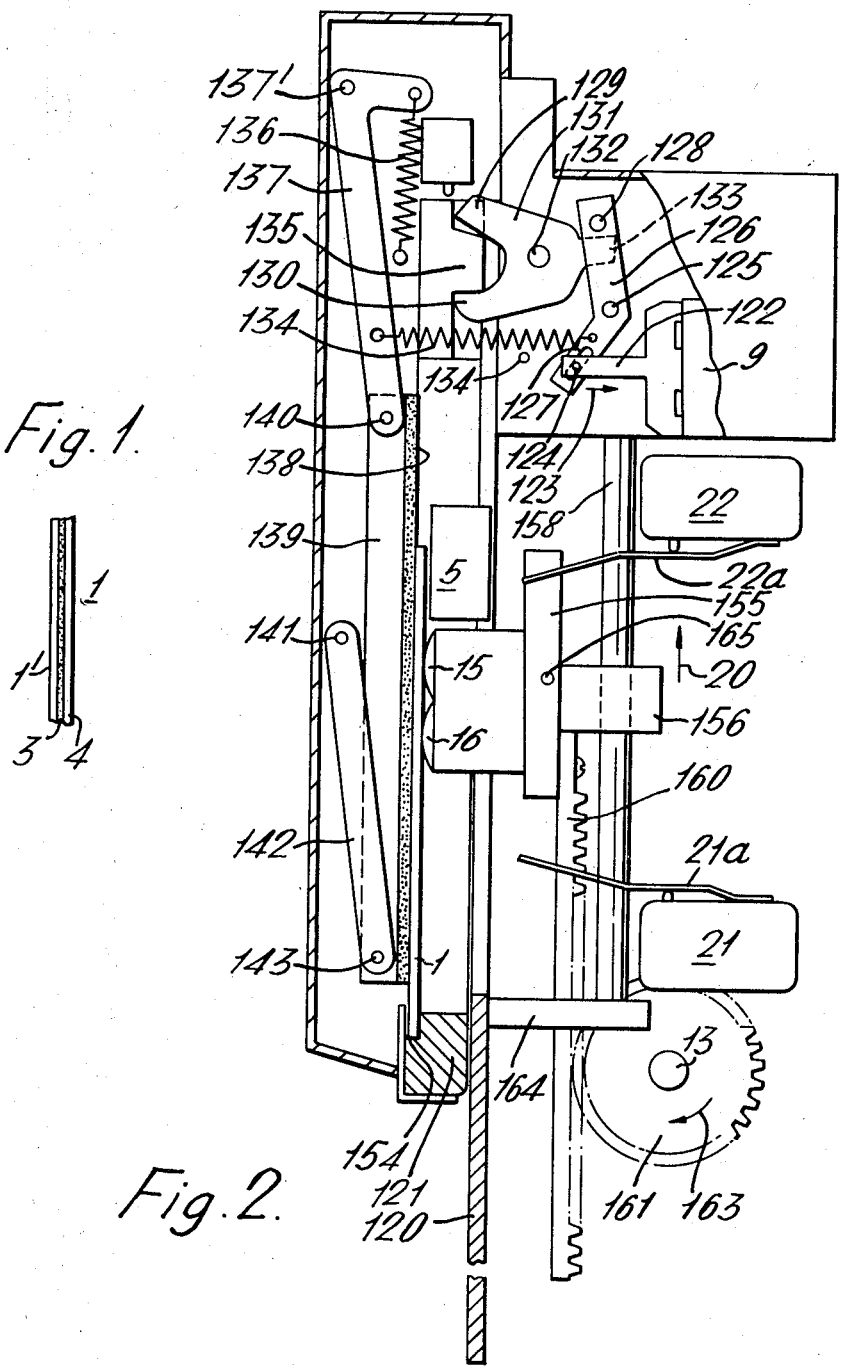

APPARATUS FOR CHANGING THE INFORMATION RECORDED ON CARDS

In automatic vending machines, tokens and tickets are used in place of coins. These, however, can be used only once, to the inconvenience of the persons concerned.

A card has been proposed, having a predetermined monetary value represented by a predetermined area thereon, so that when the card is used to purchase an article, a portion of the value-representing area corresponding to the value of the article purchased is cut off. Thus, the new value the card now has is determined by the area remaining on the card. It is, however, impossible to increase the value of the card once it has been decreased.

Accordingly, the primary object of the invention is to provide an apparatus for changing the information recorded on a card.

Another object of the invention is to provide an apparatus for giving a desired monetary value to cards used in automatic vending machines and the like, and changing, that is, increasing or decreasing the monetary value as occasions demand.

In accordance with the invention, the card has code marks representing a monetary value magnetically recorded thereon. When the card is used to purchase an article or service, the monetary value the card is given is first read and memorized and the value of the article or service purchased is subtracted from the card value, and then the result of the subtraction is recorded on the card in place of the original value that has already been erased from the card. When it is desired to increase the card value, the sum of the original card value and the value to be added is recorded on the card.

The invention will be better understood from the following detailed description thereof with reference to the accompanying drawings, wherein:

FIG. 1 is a section of a card used in the apparatus of the invention;

FIG. 2 shows a mechanical portion of the apparatus of the invention illustrating a side elevation of means for conveying the card and moving the magnetic heads for scanning the card surface;

Although the invention will be described below as applied to an automatic vending machine, it is never intended that the invention is restricted to the vending machines alone.

Referring to FIG. 1, there is shown a card 1 comprising a base 1' of a suitable plastic material and a surface layer 3 of magnetic material over one side of the base and a thin protective layer 4 covering the magnetic layer 3. The card also has an invisible mark 2 of magnetic material such as ferrite embedded therein as a test of its genuineness (FIG. 3).

Figure 3:
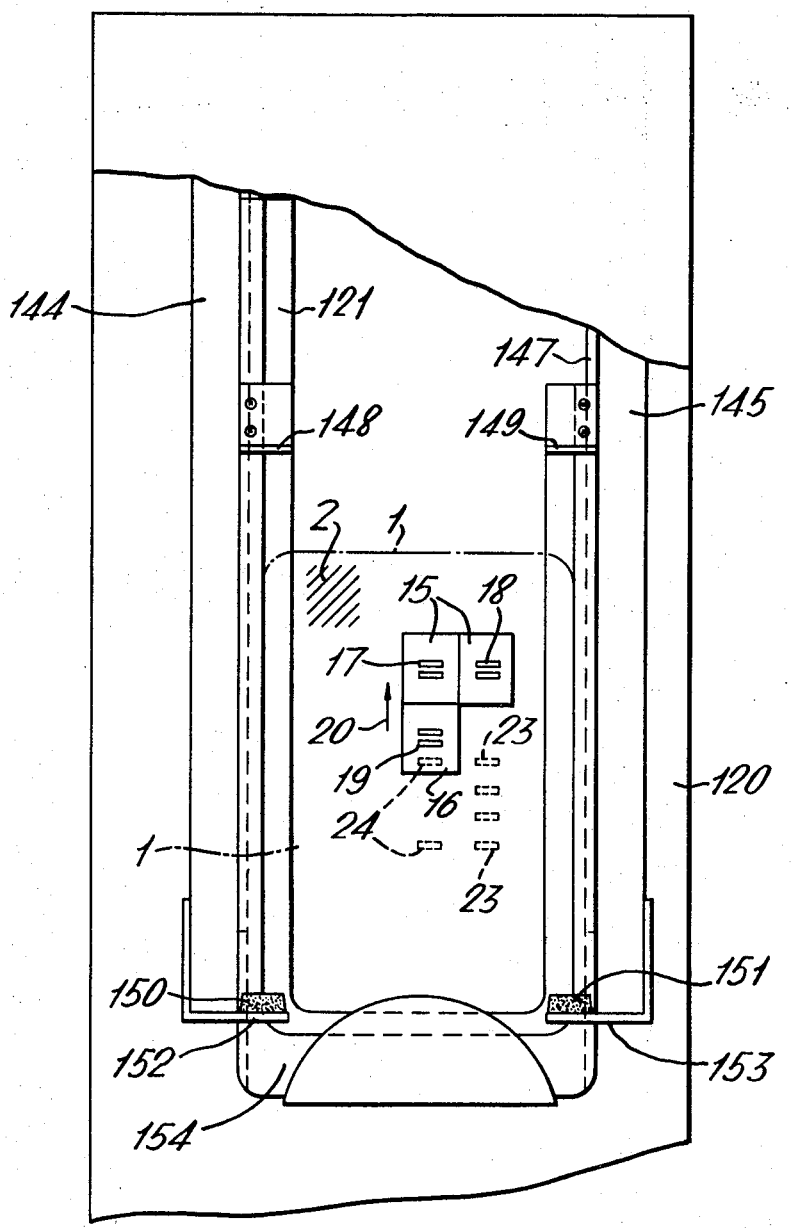
FIG. 3 is a front view of FIG. 2.
Figure 4:
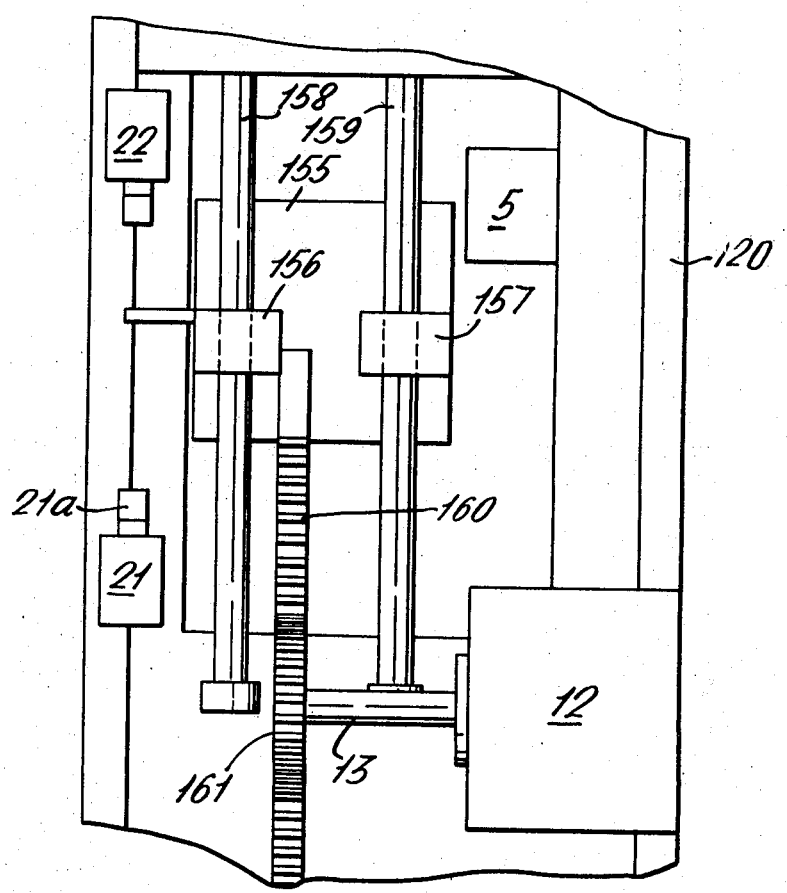
FIG. 4 is a rear view of FIG. 2.

Turning to FIGS. 2—4, the apparatus of the invention has a frame 120, in which a tray 121 is vertically movable. The tray normally is in its lowest position and is moved to its uppermost position by the person who has placed a card on the tray. A proximity detector 5 is mounted on the frame so that it detects the genuineness mark on the card to produce a signal as the card is moved into its uppermost position. The signal is utilized to energize a solenoid 9, as will be described hereinafter. Upon energization of the solenoid 9, a rod 122 (FIG. 2) is pulled in the direction of an arrow 123. The rod 122 has a pin 124 which engages with a slot 127 formed in one arm of a lever 126 pivoted as at 125. When the solenoid 9 is energized, the lever 126 pivots counterclockwise. A pin 128 stands on the other arm of the lever 126. A lever 131 has a pair of claws 129 and 130 at one side of its pivot 132 and a claw 133 at the opposite side, which latter normally engages the pin 128 to hold the lever 131 stationary at a position turned more counterclockwise than that shown in FIG. 2. In this position, the claw 129 projects in the path of the tray, while the claw 130 is out of the path of the tray, so that as the tray is moved upward, it strikes on the claw 129 to move the lever 131 clockwise until the claw 130 supports a projection 135 formed in the back of the tray. Under the condition, when the solenoid 9 is energized, the lever 126 pivots as previously mentioned, so that the pin 128 engages the claw 133 thereby preventing counterclockwise rotation of the lever 131. As a result, the tray is held in its raised position.

A spring 134 always biases the lever 126 clockwise on one hand and a lever 137 counterclockwise about a pin 137' against the force of a spring 136 on the other. The lever 137 has its lower end connected by a pin 140 to the upper end of a vertical plate 139 having a surface layer 138 made of a soft material. The lower end of the plate 139 is connected by a pivot pin 143 to the lower end of a lever 142, the upper end of which is pivoted by a point 141 to the frame 120. Upon energization of the solenoid 9, the lever 137 (and lever 142) is pivoted counterclockwise through the spring 134 until the plate 139 presses on the card so that there will be as small a gap as possible between the card and the magnetic heads to be described hereinafter.

The frame 120 is provided with a pair of parallel guide rails 144 and 145 for guiding the vertical movement of the card on the tray. Each rail 144, 145 has a tongue 147 projecting toward the tongue of the opposite rail. These tongues engage in the grooves formed in the opposite sides of the tray 121.

The tray 121 is provided intermediate its height with a pair of tongues 148 and 149 projecting forwardly from the surface of the drawing sheet as viewed in FIG. 3. A pair of stoppers 152 and 153 having cushions 150 and 151 respectively thereon are in the way of the tongues as the tray is moved downwardly into its lowest position where the tongues are received by the stoppers 152 and 153, respectively.

A pair of magnetic heads 15 and 16 are supported by a bracket 155. The head 15 comprises a head portion 17 for reading the value marks on a card or recording them thereon and a head portion 18 for reading the synchronizing marks on the card. The head 16 comprises a head portion 19 for erasing the value marks on the card. As shown in FIG. 3, the head portions 17 and 18 are arranged side by side, while the head portion 19 is positioned beneath the head portion 17.

The bracket 155 is provided at its back with a pair of blocks 156 and 157 through which guide posts 158 and 159 pierce, respectively, as shown in FIGS. 2 and 4. A rack 160 is secured to the lower end of the frame 155 and extends vertically downwardly to engage a gear 161 mounted on a shaft 13 driven by a motor 12. When the gear 161 rotates in the direction of an arrow 163, the rack is raised as shown by an arrow 20 in FIG. 2, so that the frame 155 and consequently the magnetic heads 15 and 16 are raised. Rotation of the gear 161 in the opposite direction results in the lowering of the magnetic heads 15 and 16. The frame 155 is normally at its lowest position as defined by a fixed stop bar 164, and at this position a pin 165 fixed to the frame 155 presses an actuator 21a to close a microswitch 21. When the frame 155 is at its raised position, the pin 165 presses an actuator 22a to close a microswitch 22.

As the magnetic heads 15 and 16 are raised from their lowest to their highest position, they scan the surface of a card already moved to its highest position. The card has a pair of magnetizable areas or bands, in the right-hand area of which as viewed in FIG. 3 synchronizing marks 23 are recorded so as to be scanned by the head portion 18, while in the left-hand area "value" marks 24 are recorded so as to be scanned by the head portion 17.

Card values are recorded according to the binary system. In the illustrated embodiment, since there are four bits, two of which are selected, $2^4 = 16$ and 16 different numerals, for example, 0 through 15 of the decimal system can be expressed. The marks 24 in the cards shown in FIGS. 3 and 5 express 1001, which means 9 when decimalized, while the marks in the card shown in FIG. 8 express 0111, which means 7 in the decimal system. Suppose that 1 according to the decimal system be 10 cents. The former card has a value of 90 cents, while the latter has a value of 70 cents.

As the card on the tray 121 is raised by raising the tray, the genuineness mark 2 is detected by the detector 5, whereupon the detector produces an output signal 1. It may be mentioned here that the apparatus of the invention employs various logic elements such as NOT, AND, OR, INHIBIT, MEMORY elements, etc. When these elements produce an output signal, the output signal will be referred to as being 1 or the elements, as producing an output signal 1, while when there is no output, the condition will be referred to as 0 or the elements, as producing an output signal 0. With respect to the MEMORY elements (flip-flops), they have a 0 or "set" section and a 1 or "reset" section. The input to the 0 section will sometimes be referred to as a "set" input; the input to the 1 section, as a "reset" input; the output from the 0 section, as a "set" output; and the output from the 1 section, as a "reset" output. When the set input becomes 1, the output conditions are reversed, that is, the set output becomes 1 and the reset output, 0. Under the condition, when the reset input becomes 1, the output conditions are again reversed so that the original output conditions are restored.

The signal 1 produced by the detector 5 is applied through a differentiating circuit 6 to a flip-flop 7 as a set input so as to render its reset output 0. This causes a NOT amplifier 8 to produce an output to energize the previously mentioned solenoid 9. The solenoid, when energized, has its contact 9s closed, so that a signal 1 is applied through a differentiating circuit 10 to a flip-flop 11 as a set input, whereupon its set output becomes 1 to energize the motor 12. The motor raises the heads 15 and 16 to make them scan the magnetically recorded marks 23 and 24 on the surface of the card. As the head portion 18 detects the synchronizing marks 23 one by one, it applies a signal 1 to a binary counter 26 through an OR element 25. The counter 26 has a set section T1 and a reset section T2. Normally, the set output from the section T1 is 0, while the reset output from the section T2 is 1. Every time an input is applied to the counter 26, its output condition is reversed. The same is true with binary counters 27, 28, 48, 49, 50 and 51 having set sections T3, T5, T7, T9, T11, T13 and reset sections T4, T6, T8, T10, T12 and T14, respectively.

The set outputs of the sections T1 and T3 of the counters 26 and 27 are connected through AND elements 34 and 35 and OR elements 30 and 32, respectively, to the inputs of the counters 27 and 28, while the reset outputs of the sections T2 and T4 of the counters 26 and 27 are connected through AND elements 29 and 31 and the OR elements 30 and 32, respectively, to the inputs of the counters 27 and 28. The AND elements 34 and 35 receive another input through an integrating circuit 95 from the 0 section of a flip-flop 33, while the AND elements 29 and 31 receive another input through an integrating circuit 94 to the output of the 1 section of the flip-flop 33.

When the signal 1 from the OR element 25 is applied to the counter 26 as previously mentioned, the set section T1 thereof is turned to 1 and at the same time the output from the reset section T2 thereof, to 0. At this time, the flip-flop 33 is in a reset condition, as will be described later, so that the AND elements 34 and 35 receive a signal 0 from the circuit 95 and the AND elements 29 and 31, a signal 1 from the circuit 94. As a result, the output conditions of the sections T1, T2, T3, T4, T5 and T6 are 1, 0, 0, 1, 0, and 1, respectively.

Under the condition, when the head portion 18 has detected the next one of the synchronizing marks 23, a signal 1, is applied through the OR element 25 to the counter 26, so that the outputs of the sections T1 and T2 are reversed, that is turned to 0 and 1, respectively. The signal 1 of the section T2 is applied through the AND element 29 (which receives another input from the integrating circuit 94 at this time, as previously mentioned) and the OR element 30 to the counter 27, so that the outputs of its sections T3, and T4 are turned to 1 and 0, respectively. Although the signal 1 is applied to the AND element 35, the other input thereto is 0 at this time, so that no output is produced by the AND element 35, and with no output being produced by the AND element 31, the outputs of the sections T5 and T6 of the counter 28 remain 0 and 1, respectively. Thus, the output conditions of the sections T1—T6 become 0, 1, 1, 0, 0 and 1, respectively.

When the head portion 18 has finished detection of the four synchronizing marks 23 on the card, the output conditions of the binary counters 26 —28 have changed as shown in table I, wherein No. 1 indicates the condition where the lowest mark 23 has been detected, and No. 2 indicates the condition where the next lowest mark has been detected and, in like manner, Nos. 3 and 4 indicate the conditions where the third mark from below and the uppermost mark have been detected, respectively, and No. 5 indicates the condition where the microswitch 22 has been actuated to close its contact 22s, thereby providing a signal 1 to be applied through a differentiating circuit 52 and an OR element 25 to the binary counter 26.

TABLE I

| Number | T1 | T2 | T3 | T4 | T5 | T6 |
|---|---|---|---|---|---|---|
| 1 | 1 | 0 | 0 | 1 | 0 | 1 |
| 2 | 0 | 1 | 1 | 0 | 0 | 1 |
| 3 | 1 | 0 | 1 | 0 | 0 | 1 |
| 4 | 0 | 1 | 0 | 1 | 1 | 0 |
| 5 | 1 | 0 | 0 | 1 | 1 | 0 |

The output pulse from the differentiating circuit 52 is also applied as a set input signal to the flip-flop 33, the set output of which is applied to the AND elements 34 and 35 after a time delay provided by the integrating circuit 95.

While the head portion 18 is scanning the synchronizing marks 23, the head portion 17 scans the value marks 24. The output signal 1 produced by the head portion 17 that has detected a value mark is applied through a normally closed contact 36b of a relay 36, an OR element 37 and a NOT element 38 to an OR matrix 39, to which the outputs of the sections T1 to T6 of the binary counters 26 to 28 are also applied as an input signal. The output from the matrix 39 is applied as an input to NOT elements 40—43.

Figure 5:
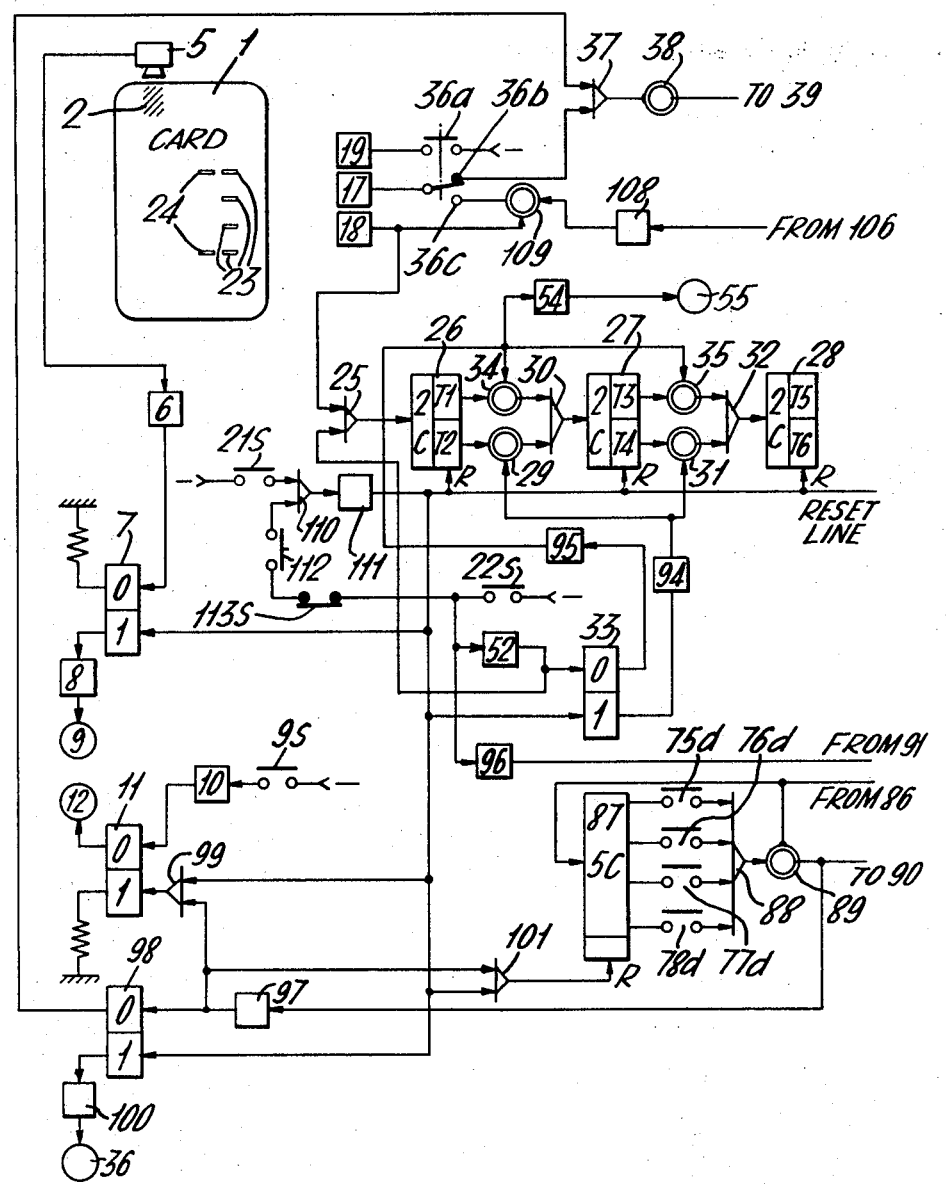
FIGS. 5, 6 and 7 are electrical circuit diagrams of the apparatus of the invention.
Figure 6:
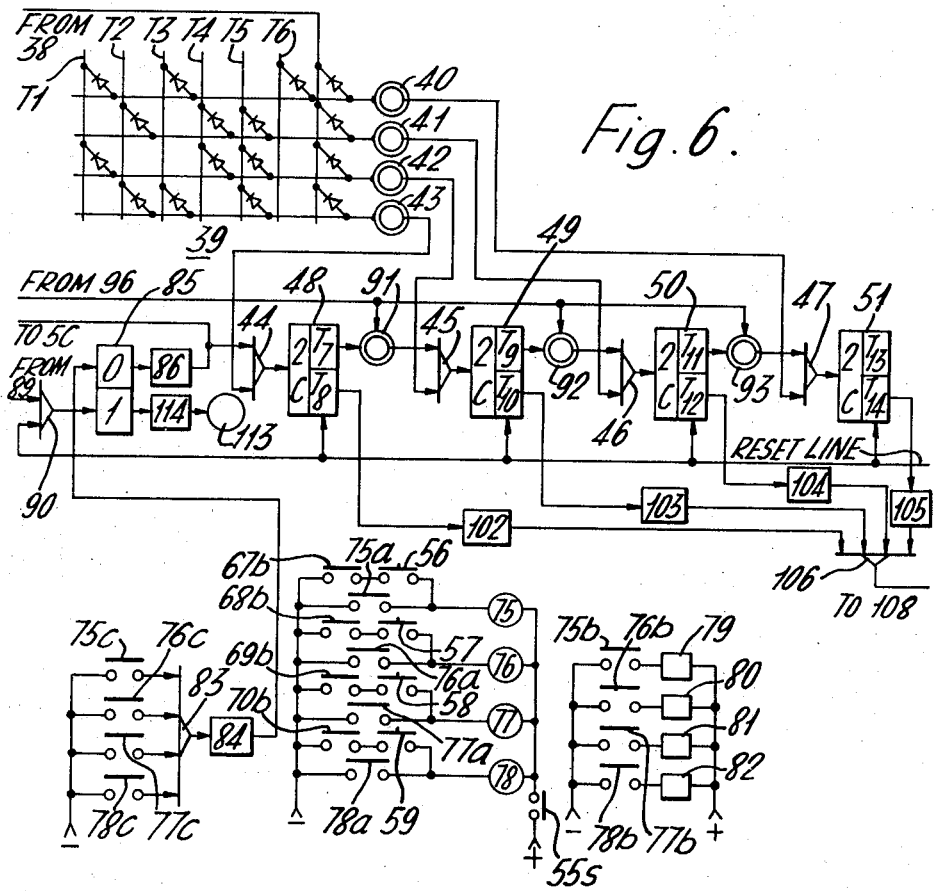

As the head portion 17 scans the value marks 24 on the card shown in FIG. 5, the sequence of its output signals will be 1 0 0 1, so that when combined with the sequence shown in table I, the output conditions of the NOT elements 40—43 change as shown in table II below. To explain one example in detail, under condition No. 1, the outputs of the sections T1 through T6 to be applied to the matrix 39 are 1, 0, 0, 1, 0 and 1 as shown in table I, so that the NOT elements 40, 41 and 42 receive an input signal 1 and, consequently, produce a signal 0. Under condition No. 1, that is, when the head portion 17 has detected a mark 24, the output of the NOT element 38 (FIG. 5) becomes 0, and this signal 0 causes the NOT element 43 to produce an output signal 1. Thus, under condition No. 1, the outputs of the NOT elements 40, 41, 42 and 43 are 0 0 0 and 1, respectively.

TABLE II

| Number | NOT 40 | NOT 41 | NOT 42 | NOT 43 |
|---|---|---|---|---|
| 1 | 0 | 0 | 0 | 1 |
| 2 | 0 | 0 | 0 | 0 |
| 3 | 0 | 0 | 0 | 0 |
| 4 | 1 | 0 | 0 | 0 |

The output signals of the NOT elements 40—43 are applied through OR elements 47, 46, 45, and 44 to binary counters 51, 50, 49 and 48, respectively, so that when the scanning of the marks has been finished, the output conditions of the set sections T7, T9, T11 and T13 and the reset sections T8, T10, T12 and T14 of the counters 48—51 will be as shown in table III below.

TABLE III

| | |
|---|---|
| T7 | 1 |
| T8 | 0 |
| T9 | 0 |
| T10 | 1 |
| T11 | 0 |
| T12 | 1 |
| T13 | 1 |
| T14 | 0 |

As shown in the above table III, the card value 1001 as expressed in binary code by the marks 24 has been memorized as the output conditions of the set sections T7, T9, T11 and T13 of the binary counters 48—51. When the head portion 17 has thus finished reading the card value, the actuator 22a is pressed to close the contact 22s of the microswitch 22, whereupon a signal 1 is applied through the differentiating circuit 52 to the flip-flop 33 as a set input to render its set output signal 1. This signal 1 is applied through the integrating circuit 95 to the AND elements 34 and 35 and at the same time energizes a relay 55 through amplifier 54. When the relay 55 has been energized, its contact 55s is closed to make ready dispensing of an article upon pressing of article selection push buttons 56—59.

Figure 7:
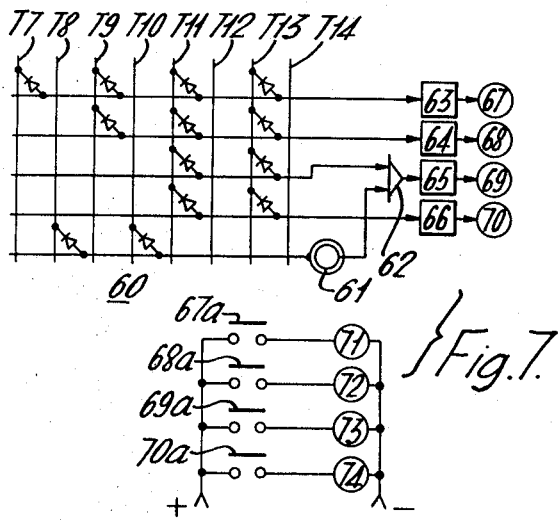

The outputs from the set and reset sections of the binary counters 48—51 are applied to the OR matrix 60 shown in FIG. 7. One output from the matrix 60 is applied through a NOT element 61 and an OR element 62 to an amplifier 65, to which another output of the matrix 60 is applied through the OR element 62. The other outputs of the matrix are applied directly to amplifiers 63, 64 and 66, respectively. The output of the amplifiers 63, 64, 65 and 66 energizes relays 67, 68, 69 and 70, respectively. The arrangement is such that when the output from any of the sections T7, T9, T11 and T13 becomes 1, the relay 67 is energized to indicate that the value of the card is more than 10 cents (0001 in binary code); when the output of any of the sections T9, T11 and T13 becomes 1, the relay 68 is energized to indicate that the card value is more than 20 cents (0010 in binary code); when either of the sections T11 and T13 produces an output signal 1, the relay 69 is energized to indicate that the card value is more than 40 cents (0100 in binary code), and when both of the sections T8 and T10 produce a signal 0, the relay 69 is energized to indicate that the card value is 30 cents (0011 in binary code) and consequently when the relay 69 is energized, it is indicated that the card value is more than 30 cents; and finally when either of the sections T11 and T13 produces a signal 1, the relay 70 is energized to indicate that the value is more than 40 cents. The relays 67—70 have contacts 67a—70a and 67b—70b, respectively. The contacts 67a—70a are connected in series with lamps 71—74, respectively. The card value is indicated by these lamps. The relay contacts 67b—70b are connected in series with the article-selection pushbutton switches 56-—**respectively. So long as the relay contacts are open, no article will be dispensed even when the corresponding pushbuttons have been pressed. To put it in more concrete terms, if the card has a value of 20 cents, the contacts 67a, 68a, 67b and 68b will have been closed so that the lamps 71 and 72 will light on to indicate that the card value is 20 cents. In this case, only when the pushbutton switch 56 or 57 has been pressed, a corresponding article will be dispensed.

The pushbutton switches 56—69 are also connected in series with relays 75—78, which have self-holding contacts 75a-—78a, respectively. The relays 75—78 also have contacts 75b—78, 75c—78c, and 75d—78d, respectively. When one of the contacts 75b—78b is closed, the corresponding one of the solenoids 79—82 connected in series with the contacts, respectively is energized, so that a corresponding article will be dispensed. For example, when the solenoid 81 is energized, an article of 30 cents is dispensed. When any one of the contacts 75c—78c is closed, a signal 1 is applied through an OR element 83 and a differential circuit 84 to the 0 section of a flip-flop 85, the set output of which triggers a pulse generator 86 to produce a series of pulses. These pulses are applied through an OR element 44 to the binary counter 48 on the one hand and a pentanary counter 87 on the other. Whenever the counter 87 receives one pulse from the generator 86, the output signal 1 is shifted from one of the output terminals of the counter to the next below. The relay contacts 75d — 78d are connected to the four output terminals of the counter 87, respectively.

When an output 1 appears at that one of the four output terminals of the counter 87 the relay contact 75d, 76d, 77d or 78d connected to which has been closed, this output signal 1 is applied through an OR element 88, an INHIBIT element 89 and an OR element 90 to the reset section of the flip-flop 85, whereupon its set output is rendered 0, so that the pulse generator 86 stops producing pulses.

The pulses from the generator are also applied to the binary counter 48. At this time, a signal 1 caused by the closure of the microswitch contact 22s is already applied through the integrating circuit 96 to one input of the AND elements 91, 92 and 93. Consequently, the number of pulses applied from the generator 86 is subtracted from the number of pulses then memorized in the binary counters 48—51. Suppose, for example, that an article of 20 cents has been purchased, and the contacts 76d of the relay 76 will have been closed due to the pressing of the pushbutton 57, so that the output conditions of the binary counters 48—51 change from those shown in table III to those shown in table IV below.

TABLE IV

| | |
|---|---|
| T7 | 1 |
| T8 | 0 |
| T9 | 1 |
| T10 | 0 |
| T11 | 1 |
| T12 | 0 |
| T13 | 0 |
| T14 | 1 |

As shown in table IV, the output conditions of the sections T13, T11, T9 and T7 are 0111 in binary code, which means 7 when decimalized, and represents 70 cents. Originally, the card had a value of 90 cents, and an article of 20 cents has been purchased, so that the card must now have the original value of 90 cents erased and a new value of 70 cents, that is, 90 minus 20, recorded thereon.

When the subtraction has been finished in the binary counters 48—51, the output signal 1 of the INHIBIT element 89 is applied to differentiating differential circuit the output of which sets a flip-flop 98 and is also applied to OR element 99 to reset the flip-flop 11. When the flip-flop 98 has been set, its output 0 is applied to a NOT amplifier 100, the output of which energizes the relay 36, whereupon the contacts 36a, 36b and 36c are switched so that the demagnetizing head portion 19 will operate and the head portion 17 gets ready for recording. When the flip-flop 11 has been reset, its set output becomes 0, so that the motor 12 is rotated in the reverse direction to move the frame 155 downward. At this time, the pentanary counter 87 has already been reset due to the reset signal 1 applied to the reset terminal R through the differential circuit 97 and an OR element 101.

Figure 8:
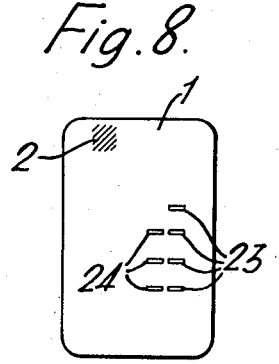
FIG. 8 is a plan view of the card having a different value from that shown in FIGS. 3 and 5.

When the heads 15 and 16 lower, the head portion 19 precedes the head portion 17. Since the head portion 19 is being energized through the relay contact 36a closed at this time, the head portion 19 erases the value marks 24 originally recorded on the card. On the other hand, the head portion 18 detects the synchronizing marks 23 one after another and produces an output signal 1, one for every one mark that has been detected, to be applied through the OR element 25 to the binary counter 26. At this time, with the set output signal 1 of the flip-flop 33 being applied through the integrating circuit 95 to the AND elements 34 and 35, the binary counters 26, 27 and 28 operate so that subtraction is conducted. That is, the output conditions of the counters 26—28 change in the order reverse to that shown in table I. During this course of change in the counter output conditions, the NOT elements 40—43 successively produce a signal 1, which removes the output at the set sections T13, T11, T9 and T7 of the binary counters 51—48, and at the same time causes the reset sections T14, T12, T10 and T8 to produce an output successively in the order of the reset sections mentioned. The output signals from these reset sections are applied through differential circuits 105, 104, 103 and 102, respectively, and thence through an OR element 106, a monostable multivibrator 108 and an AND element 109 to the magnetic head 17. To the AND element 109 is also applied an output pulse from the head portion 18 as the latter head portion senses the synchronizing marks 23 on the card one by one. Consequently, if the signal from the OR element 106 is 1, coinciding with the signal 1 from the synchronizing head, the head 17 records a value mark on the card. On the contrary, if the signal from the OR element 106 is 0, no value mark is recorded. Thus, in the above example, the value of 70 cents is recorded on the card as 0111 in binary code as shown in FIG. 8.

Upon completion of the recording, that is, when the frame 155 has arrived at the lowest position, the pin 165 presses the actuator 21a of the microswitch 21 so as to close its contact 21s, whereupon a signal 1 is applied through an OR element 110 and a differential circuit 111 to the reset terminals R of all binary counters and also to the reset input terminals of the flip-flops. When the flip-flop 7 has thus been reset, the solenoid 9 is deenergized to release the lock on the tray 121 to let it gravitate to the lowest position, where the owner of the card can take it out from the tray.

If the person who has placed a card in the machine happens to change his or her mind, a pushbutton switch 112 (FIG. 5) may be pressed, so that a signal 1 is applied to the differentiating circuit 111, the output of which resets the binary counters and the flip-flops, as previously mentioned. To bring about the result, however, it is necessary for a contact 113s of a relay 113 to be closed when the pushbutton switch 112 has been pressed. The relay 113 is energized through a NOT amplifier 114 by the reset output signal 0 from the flip-flop 85 that has been set. Therefore, before any of the article selection pushbuttons have been pressed, the person who placed a card on the tray is free to refrain from the buying action.

Having illustrated and described a preferred embodiment of the invention, it is understood that there may be many changes and modifications thereof. In the illustrated embodiment of the invention as applied to an automatic vending machine, the card value is first read and memorized, and the value of the article that has been purchased is subtracted from the value of the card, and then the result of the subtraction is recorded on the card with the original value having been erased therefrom. If, instead of applying the set output signals from the binary counters 48—50 to the AND elements 91—93, the reset outputs of these binary counters are applied to these AND elements, respectively, summation, instead of subtraction, is conducted. Then, if the selection pushbutton switches 56—59 are replaced by coin-actuated contacts, for example, if the switch 58 is arranged to be closed by three dimes, a new value equal to the sum of the original value and 30 cents will be recorded on the card. Since the value of a card decreases upon every use in a vending machine, the above arrangement may conveniently be used to increase the card value when the owner of the card so desires.

The invention is not only applicable to automatic vending machines, but it may also be used for many other purposes, for example, recording the number of articles or parts stored in a warehouse.

The card may be of any other shape than a rectangle, and also of any other material than plastic materials. The genuineness mark of the card may also be any other material than ferrite, and the genuineness test may be conducted in any other suitable way. The movement of the magnetic heads relative to the card not necessarily linear but may also be circular, for example. The bit number may be more than four bits, and any system other than the binary system may be employed, if desired.

We claim:

1. Apparatus for changing the value given to a card, said value being recorded on said card in the form of code marks, comprising: means for reading said code marks means for memorizing said code as represented by said code marks; code providing means for providing another code representing another value by which said card value is to be changed; means for performing addition or subtraction between the values represented by said memorized code and said other code; means for recording the result of said calculation on said card in the form of code marks; and means for preventing said code providing means from applying said other code to said calculating means when the value represented by said other code is greater than the value represented by said memorized code.

2. The apparatus of claim 1, wherein said card is provided with an element by which to test the genuineness of the card, and further including means for detecting said element.

3. The apparatus of claim 1, further including: means for holding said card; means for moving said card holding means into a predetermined position; means for locking said card holding means at said predetermined position; means for causing said reading, erasing and recording means to scan the surface of said card at said locked position; and means for releasing said lock when said reading, erasing and recording have been finished.

4. The apparatus of claim 3, wherein said last but one means effects a relative movement of said reading, erasing and recording means with respect to said card at said locked position.

5. The apparatus of claim 4, wherein said relative movement comprises a first course wherein said reading means operates, and a second course subsequent to said first course and in the opposite direction thereto, wherein said erasing and recording means operate, the former preceding the latter.

6. The apparatus of claim 5, wherein said card is provided with synchronizing marks, and further including means for detecting said synchronizing marks; and means for actuating said mark reading means to operate as said detecting means detects said synchronizing marks during said first course of said relative movement and actuating said recording means to operate as said detecting means detects said synchronizing marks during said second course of said relative movement.

7. The apparatus of claim 1, wherein said reading and recording means are the same.

8. The apparatus of claim 1, wherein said code marks are magnetically recorded on said card.

9. A control apparatus for a vending machine operated by a control card having code marks thereon representing the purchasing value of the card comprising in combination: means for reading said code marks and memorizing the code represented by said marks; code means for providing another code representing another value by which the card value is to be changed; calculation means for performing addition or subtraction between the values represented by the memorized code and said other code; code recording means for recording the results of calculations on the card in the form of code marks; article dispensing control circuit means including manually operable article selection means for controlling the generation of said other code; and circuit means preventing the dispensing of a selected article when the value represented by said other code is greater than the value represented by said memorized code read from the card, whereby the dispensing of an article is prevented when the purchasing value of a given card is not at least equal to the value of the selected article.